United States Patent [19]
Waku et al.

[11] 3,871,745
[45] Mar. 18, 1975

[54] VISUAL INFORMATION STORAGE AND DISPLAY DEVICE

[75] Inventors: Shigeru Waku; Shintaro Hayashi, both of Tokyo; Hiroyuki Shibata, Tokorozawa; Takehisa Kawashima, Tokyo, all of Japan

[73] Assignee: Nippon Telegraph & Telephone Public Corporation, Tokyo, Japan

[22] Filed: Mar. 21, 1973

[21] Appl. No.: 343,337

[30] Foreign Application Priority Data
Mar. 27, 1972  Japan.............................. 47-29782
Nov. 14, 1972  Japan.............................. 47-11344

[52] U.S. Cl................ 350/150, 264/61, 340/173.2, 350/157
[51] Int. Cl. ............................................. G02f 1/26
[58] Field of Search.................... 350/147, 150, 160; 252/62.9; 264/61, 65

[56] References Cited
UNITED STATES PATENTS

| | | | |
|---|---|---|---|
| 3,499,704 | 3/1970 | Land et al...................... | 350/147 X |
| 3,512,864 | 5/1970 | Haertling et al................ | 350/147 X |
| 3,602,904 | 8/1971 | Cummins........................ | 350/150 X |
| 3,630,597 | 12/1971 | Hulme .............................. | 350/150 |
| 3,666,666 | 5/1972 | Haertling........................ | 350/150 X |

*Primary Examiner*—John K. Corbin
*Attorney, Agent, or Firm*—Sughrue, Rothwell, Mion, Zinn & Macpeak

[57] ABSTRACT

A visual information storage and display device provided with a thin ceramic sheet prepared from a transparent ferroelectric ceramic block having an optical uniaxial anisotropy, wherein the direction of polarization axis orients antiparallel and that of optical axis orients parallel to the direction of applied pressure at hot-pressing stage.

11 Claims, 6 Drawing Figures

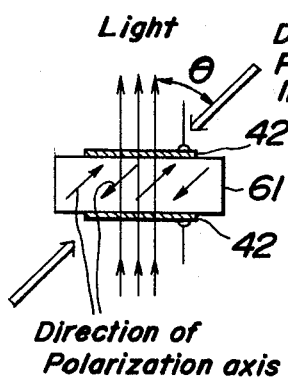
FIG_1
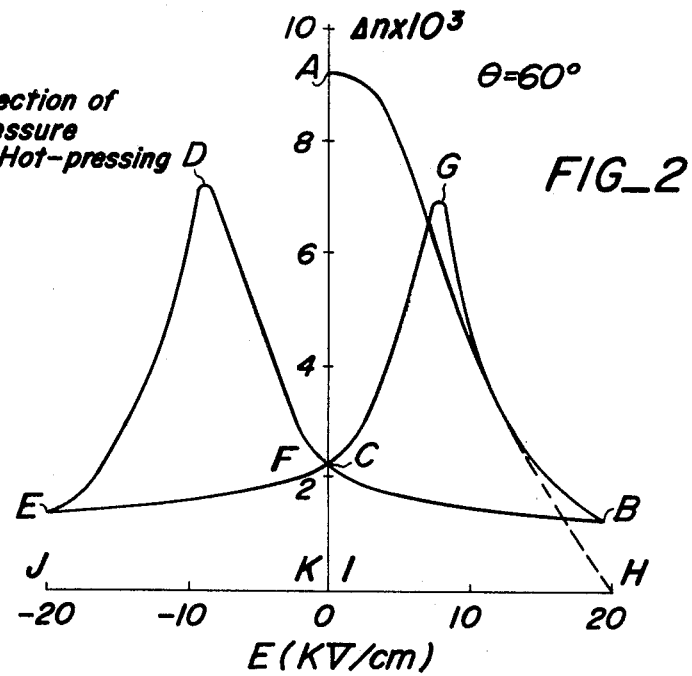
FIG_2
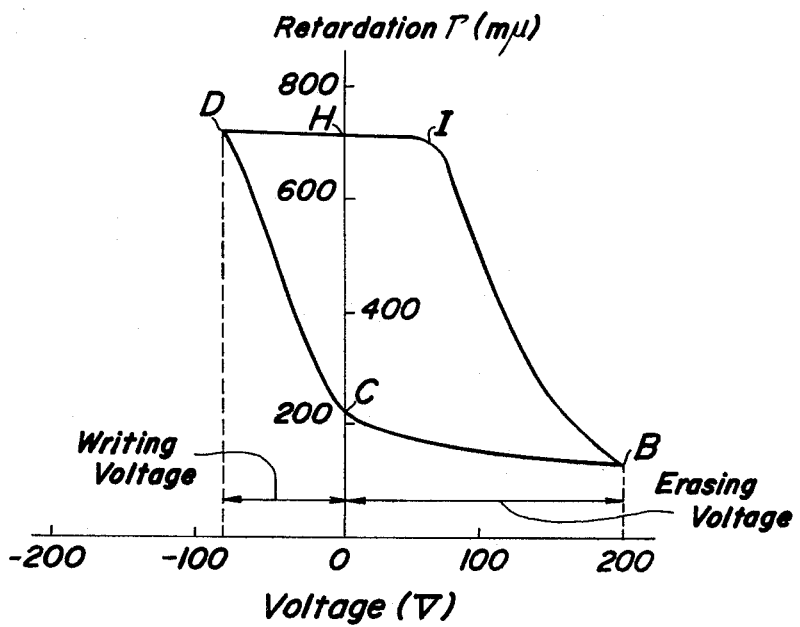
FIG_3

FIG_4
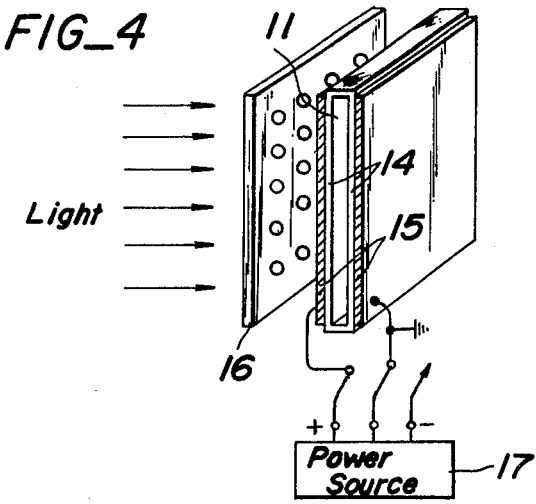
FIG_5
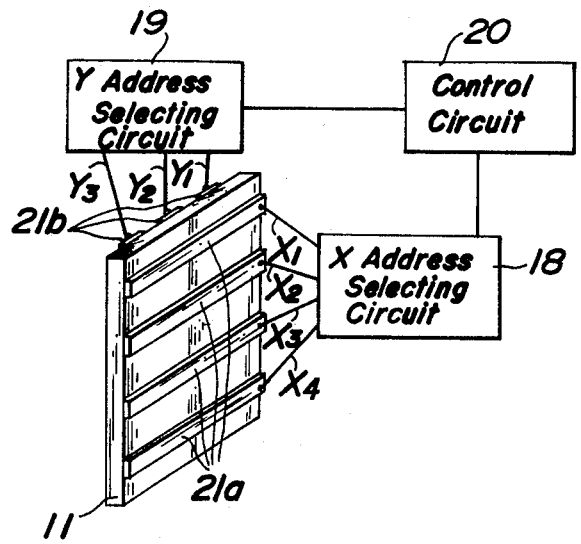
FIG_6
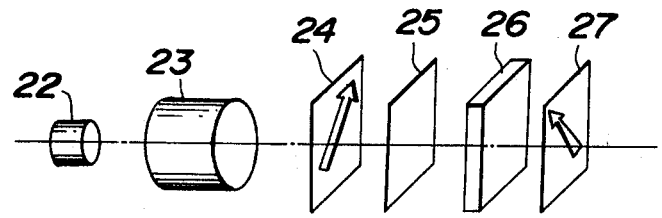

VISUAL INFORMATION STORAGE AND DISPLAY DEVICE

BACKGROUND OF THE INVENTION

1. Field of the Invention:

The present invention relates to an information storage and display device provided with an optically anisotropic transparent ferroelectric ceramic.

2. Description of the Prior Art:

In general, transparent ferroelectric ceramics are isotropic, but when an electric field is applied to the ceramic, the direction of its polarization axis orients toward the direction of the electric field and as a result, an optical anisotropy appears. Such an anisotropy is retained unchanged even after removal of the electric field. Having such characteristics, the ferroelectric ceramics are known to be adaptable for storaging and displaying of visual informations. In the transparent ferroelectric ceramics there are two anisotropies caused by an electric field. Namely, it is known that in case of coarse ceramic particles having a grain size of more than about 2 $\mu$m, the anisotropy having light scattering characteristic appears, while in case of fine ceramic particles having a grain size of less than 2 $\mu$m, there is an optically uniaxial anisotropy having an optical axis in the direction of the electric field.

As a system for writing and reading informations by light, a display device utilizing an optical variation of mechanically induced optical anisotropy in the direction of the applied electric field, that is, a longitudinal electric field effect is reported by A. H. Meitzler et al, in "Image Storage and Display Devices Using Fine-grain, Ferroelectric Ceramics," Bell System Technical Journal Vol. 49, Number 6, pages 953–957, 1970. Further, as a system for electrically writing information and reading them by light, a method of using the optical variation in the direction of the electric field, that is, the longitudinal electric field effect is reported by H. N. Robert, in "Strain-Biased PLZT Input Devices (Page Composers) for Holographic Memories and Optical Data Processing," Applied Optics, Volume 11, No. 2, pages 397–404, 1972. Moreover, as a method of using the optical variation perpendicular to the electric field, that is, a lateral electric field effect, electro-optic devices are described in U.S. Pat. Nos. 3,499,704, 3,512,864 and 3,531,182.

The inventors of the present application have found that by appropriately selecting hot-pressing conditions, ferroelectric ceramics having a uniaxial birefringence wherein the direction of polarization axis orients antiparallel and that of optical axis orients parallel to the pressure direction in the hot-pressing can be obtained and further that when a thin sheet is cut out from the said ferroelectric ceramic block in such a manner that an angle between the normal direction to the surface of the sheet and the said optical axis in 90°–30°, preferably 70°–60° and the electric field is applied thereto, the difference of birefringence in the direction of the electric field is maximized and as a result, novel information storage and display devices have been realized by using such ferroelectric ceramics.

SUMMARY OF THE INVENTION

An object of the present invention is to provide a novel information storage and display device using a ferroelectric ceramic having a uniaxial birefringence wherein direction of polarization axis orients antiparallel and that of optical axis orients parallel to direction of pressure in hot-pressing.

Another object of the present invention is to provide an information storage and display device having a high contrast wherein the difference of optical retardation is large without applying strain-bias to the ceramic sheet in order to orient the polarization axis of the ferroelectric ceramic sheet.

The information storage and display device according to the present invention is characterized by comprising a thin ceramic sheet cut out from transparent ferroelectric ceramic block having an optically uniaxial anisotropy, wherein the direction of polarization axis orients antiparallel and that of optical axis orients parallel to the direction of pressure at hot-pressing stage, in such a manner that an angle between the normal direction to the surface of the ceramic sheet and the said optical axis is 90°–30°, preferably 70°–60°, photoconductive films and transparent electrodes provided on both sides of the ceramic sheet for writing and erasing informations by light or transparent electrodes provided on the surface of the ceramic sheet in a matrix array for electrically writing and erasing informations; a light source and a power source for writing and erasing informations by light or an electronic circuit utilizing a longitudinal electric field effect of the ceramic sheet for electrically writing and erasing informations; and a means of polarized light optic system for reading and displaying informations by light.

The details and objects as well as the characteristic feature of the present invention will become more apparent and more readily understandable by the following description and the appended claims when read in conjunction with the accompanying drawings.

BRIEF DESCRIPTION OF THE DRAWINGS

FIG. 1 is an illustrative view showing an anisotropy of the ceramic sheet to the pressure direction in hot-pressing according to the present invention;

FIG. 2 is a graph showing a relation between the electric field and the birefringence when the electric field is applied to the ceramic sheet having an optical anisotropy according to the present invention;

FIG. 3 is a graph showing a variation of retardation caused by electric field in an information storage and display device according to the present invention;

FIGS. 4 and 5 are perspective views of an embodiment of an information storage and display substrate according to the present invention, respectively; and FIG. 6 is a diagrammatically schematic view of an optic system for displaying informations according to the present invention.

DESCRIPTION OF THE PREFERRED EMBODIMENTS

Transparent ferroelectric ceramic blocks are usually prepared by hot-pressing. When the transparent ferroelectric ceramic block is cut and abraded into a thin sheet, a double refraction generally appears in the thin sheet. However, it has hitherto been considered that such a phenomenon has been caused by strain induced at mechanical processing. Therefore, the double refraction of the thin ceramic sheet has been removed by annealing so as to be adapted to various devices as mentioned above.

After having various experiments, we have arrived to a conclusion that the double refraction is not caused by the processing strain but by the pressure in hot-pressing and it has been found out that materials having very uniform birefringence can be obtained by appropriately selecting the hot-pressing conditions. For instance, when a composition of $(Pb_{0.96}La_{0.04})(Zr_{0.65}Ti_{0.35}O_3)$ is hot-pressed at 1,100°C and 7,000 psi for 48 hours, the coefficient of variation (standard variation/mean value) of birefringence in the hot-pressed sample can be made about 1.5%.

This birefringence is considered to be uniaxial wherein the direction of applying pressure in hot-pressing is taken as an optical axis and the direction of polarization axis orients antiparallel to said direction of pressure by the pressure effect of the hot-pressing.

A thin sheet specimen 61 is cut out from the transparent ceramic block having the aforesaid birefringence and provided with transparent electrodes 42, 42 as shown in FIG. 1. The birefringence $\Delta n$ of the resulting assembly in the direction of electric field is measured by changing the applied voltage and as a result the characteristic curve as shown in FIG. 2 is obtained. On the contrary, if the double refraction of the specimen is removed by annealing, the birefringence in the direction of electric field always becomes zero, so that the characteristic curve as shown in FIG. 2 is not obtained. The conventional transparent ceramic sheet cut out from hot-pressed ceramic block is abraded and then always subjected to an annealing treatment. This sheet, after annealing may be applied with an electric field to orient the polarization axis and again cut in the direction of electric field and then abraded to form a specimen as shown in FIG. 1 (transparent ferroelectric ceramic thin sheet). However, this speciment has birefringence ($\Delta n$) - electric field characteristic not passing along ABCDEFGB shown in FIG. 2 but passing along AHIJKH shown in the amended FIG. 2. From this fact, it is clear that the birefringence is not caused by annealing.

When the characteristic curve as shown in FIG. 2 is used, it is possible to store and display information by an operating principle as shown in FIG. 3. That is, when a voltage corresponding to an erasing or writing voltage of FIG. 2 is applied between the transparent electrodes and returned to zero, the retardation $\Gamma$ becomes C or H. Therefore, the difference of retardation corresponding to HC is caused between the erasing state and the writing state. For this reason visual information can be displayed with a means of polarized light optic system composed of monochromatic light source, polarizer, compensator and analyzer, etc. The difference of retardation corresponding to HC varies with an angle $\phi$ shown in FIG. 1 (i.e., angle between the normal direction to the surface of the transparent ceramic sheet and the direction of pressure in hot-pressing) when the thickness of the transparent ceramic sheet is constant (retardation $\Gamma$ is the product of the birefringence $\Delta n$ of the sample and the thickness $t$ of the sample, i.e. $\Gamma = \Delta n \times t$) and becomes maximum at an angle of 70°-60°. In this case, the difference of birefringence is about $5 \times 10^{-3}$ as shown in FIG. 2 and the requirement $\lambda/2$ for maximizing the contrast is easily satisfied by a thickness of about 60 $\mu$m.

As seen from the above explanation, the present invention utilizes the hysteresis phenomenon by electric field in the birefringence of the thin ceramic sheet cut out from the transparent ferroelectric ceramic bearing a double refraction by hot-pressing and it makes possible to eliminate all defects in the conventional strain-biases system; that is, according to the present invention it is not necessary to apply the mechanical stress to the ceramic sheet as in the conventional strain-biased system, so that there is no danger in the breakage due to fatigue and also no auxiliary equipment for applying the stress is required and further a sufficiently large retardation difference is obtained. Furthermore, the present invention can maintain all the merits of the conventional strain-biased system and thus provides useful devices.

The construction of the device according to the present invention will be explained hereinafter.

FIG. 4 shows an information storage and display substrate for writing and erasing the information by light, FIG. 5 shows an information storage and display substrate for electrically writing and erasing the information and FIG. 6 shows an optic system for displaying the information.

In case of writing and erasing information by light, photoconductive films 14, 14 are provided on both sides of the transparent ceramic sheet 11 and further transparent electrodes 15, 15 are provided thereon as shown in FIG. 4. In order to write the information, a voltage corresponding to the writing voltage of FIG. 3 is applied between the transparent electrodes 15, 15 by using a power source 17 for writing and erasing, while a light is exposed through a mask 16 recording an information to be displayed. The mask 16 may be a photographic film. According to the need the information may directly be focussed on the information storage and display substrate through a lens system without using the photo-mask 16. Further, it is also possible to effect a method of scanning on the information storage and display substrate by a light beam. In order to erase the information, a voltage corresponding to the erasing voltage of FIG. 3 is applied between the transparent electrodes 15, 15 by using the power source 17, while only the portion to be erased is exposed to the light.

In case of writing and erasing the informations by an electric signal, transparent electrodes 21a and 21b are provided in a matrix array on both sides of the transparent ceramic sheet 11 so as to perpendicularly intersect each other and connected to a control circuit 20 through X and Y address selecting circuits 18 and 19 as shown in FIG. 5. For instance, when the information is written in a point of intersection of $X_3$ and $Y_2$, address signals of $X_3$ and $Y_2$ are taken out from the control circuit and then a pulse having an amplitude corresponding to the writing voltage of FIG. 3 is generated so as to cause retardation due to longitudinal electric field effect, whereby the information in storaged as the variation of retardation. In order to erase the information, a pulse having its amplitude corresponding to the erasing voltage of FIG. 3 is applied after the address signal. In order to display the image stored on the information storage and display substrate, a polarized light optic system composed of a monochromatic light source 22, a collimator 23, a polarizer 24, a compensator 25, an information storage and display substrate 26 and an analyzer 27 as shown in FIG. 6 is used.

The transparent ferroelectric ceramic sheet 11 is cut out from the ceramic block prepared by hot-pressing. Such a ceramic block is homogeneous and transparent ferroelectric ceramics prepared by hot-pressing from fine particles having a grain size of less than about 2 $\mu$m and consists of barium titanate or lead zirco-titanate. A typical example of the transparent ferroelectric ceramics is a solid-solution containing $PbZrO_3$ and $PbTiO_3$ in a molar fraction of 65:35 and adding about 8 mol% or less of at least one element of La, Sm, Nd, Ta and W thereto. The ceramic block of lead zirco-titanate is prepared as follows: (1) The starting oxides having a purity of reagent grade are weighed so as to blend them in a given composition, (2) the resulting mixture is wet-mixed by adding a proper liquid, (3) the mixture is dried and calcined at about 900°C for 1 hour, (4) the calcined mixture is wet-pulverized by adding a proper liquid, (5) the resulting powders are cold-pressed after dried and then placed in an alumina mold, and then (6) hot-pressing is carried out at a temperature of about 1,000–1,300°C under a pressure of 2,000–10,000 psi for 2–60 hours. In this case, the conditions of 1,100°C, 7,000 psi and 48 hours are optimum and it is desirable to effect hot-pressing in vacuo. (7) The resulting ceramic block is cooled to room temperature while placing it in the mold, and (8) the cooled block is taken out from the mold.

The thus obtained ceramic block shows a uniaxial birefringence wherein the direction of polarization axis orients antiparallel and that of optical axis orients parallel to the direction of applied pressure in hot-pressing. Then, a ceramic sheet is cut out from the ceramic block by means of a cutter and ground at both sides to a thickness of about 100 μm to form a transparent ferroelectric ceramic sheet 11. The cutting point of the ceramic sheet is such that an angle between the normal direction to the surface of the ceramic sheet and the pressure direction in hot-pressing is 90°–30° preferably 70°–60°.

The photoconductive film 14 of FIG. 4 acts that it has a satisfactorily high resistivity and prevents the application of the electric field to the transparent ceramic sheet 11 when the light is not exposed, while the resistivity lowers when the light is exposed and it applies the electric field to the transparent ceramic sheet 11. As the photoconductive film, materials, such as modified polyvinyl carbazole, cadmium sulfide, cadmium selenide and the like are used. The transparent electrodes 15, 15 of FIG. 4 and 21a, 21b of FIG. 5 are composed of gold, $In_2O_3$, $SnO_2$ or the like and are provided in a well-known manner.

The optic device according to the present invention is adapted to an electro-optic switch matrix, a page composer and an optical logic element in addition to an information storage and display device.

Various modifications are possible without departing from the spirit of the present invention as substantially claimed in the appended claims.

What is claimed is:

1. An information storage and display device which comprises a thin ceramic sheet having an optical axis oriented before the application of electrodes thereto at an angle of between 30° and 90° with the normal direction to the surface of the sheet, said sheet being cut out from a transparent ferroelectric ceramic block having an optically uniaxial anisotropy without annealing, wherein the direction of polarization axis orients antiparallel and that of optical axis orients parallel to direction of applied pressure during and after the hot-pressing stage; photoconductive films and transparent electrodes for writing and erasing informations by light and provided over both sides of said ceramic sheet; a light source and a power source for writing and erasing information by light; and a means of polarized light optic system for displaying the storaged informations.

2. The device as claimed in claim 1, wherein said transparent ferroelectric ceramic block is a solid-solution consisting essentially of $Pb(Zr_{0.65}Ti_{0.35})O_3$ and adding at least one element of lanthanum (La), samarium (Sm), neodymium (Nd), tantalum (Ta) and wolfram (W) in a molar fraction of not more than 8%, which is prepared by hot-pressing and has an optically uniaxial anisotropy wherein the direction of polarization axis orients antiparallel and that of optical axis orients parallel to the direction of applied pressure at hot-pressing stage at a temperature of less than Curie point.

3. The device as claimed in claim 1, wherein said angle between the normal direction to the surface of the sheet and the optical axis is between 70° and 60°.

4. The device as claimed in claim 1, wherein said light source for writing and erasing informations by light includes a means for illumination spatially modulated by informations.

5. The device as claimed in claim 1 which further comprises a means for illumination by scanning light beam, the intensity of which being modulated by the application of electric field and the informations to be recorded.

6. The device as claimed in claim 1, wherein said means of polarized light optic system is composed of a monochromatic light source, a polarizer, a compensator and an analyzer.

7. An information storage and display device which comprises a thin ceramic sheet having an optical axis oriented before the application of electrodes thereto at an angle of between 30° and 90° with the normal direction to the surface of the sheet, said sheet being cut out from a transparent ferroelectric ceramic block having an optically uniaxial anisotropy formed without annealing wherein the direction of polarization axis orients antiparallel and that of optical axis orients parallel to the direction of applied pressure in the hot-pressing; transparent electrodes in a matrix array for electrically writing and erasing informations and provided on both sides of said thin ceramic sheet; an electric circuit for electrically writing and erasing informations; and a means of polarized light optic system for displaying the storaged informations.

8. The device as claimed in claim 7, wherein said transparent ferroelectric ceramic block is a solid-solution consisting essentially of $Pb(Zr_{0.65}Ti_{0.35})O_3$ and adding at least one element of lanthanum (La), samarium (Sm), neodymium (Nd), tantalum (Ta) and wolfram (W) in a molar fraction of not more than 8%, which is prepared by hot-pressing and has an optically uniaxial anisotropy wherein the direction of polarization axis orients antiparallel and that of optical axis orients parallel to the direction of applied pressure at hot-pressing stage.

9. The device as claimed in claim 7, wherein said angle between the normal direction to the surface of the sheet and the optical axis is selected from 70° to 60°.

10. The device as claimed in claim 7, wherein said electronic circuit is composed of X address selecting circuit and Y address selecting circuit.

11. The device as claimed in claim 7, wherein said means of polarized light optic system is composed of a monochromatic light source, a polarizer, a compensator and an analyzer.

* * * * *

UNITED STATES PATENT OFFICE
CERTIFICATE OF CORRECTION

PATENT NO. : 3,871,745
DATED : March 18, 1975
INVENTOR(S) : Shiegeru Waku; Shintaro Hayashi, Hiroyuki Shibata, Takehisa Kawashima It is certified that error appears in the above-identified patent and that said Letters Patent are hereby corrected as shown below:

IN THE HEADING:

Foreign Application Priority Data:

Delete "47-11344" and insert --47-113443--

Signed and sealed this 20th day of May 1975.

(SEAL)
Attest:

RUTH C. MASON
Attesting Officer

C. MARSHALL DANN
Commissioner of Patents
and Trademarks